Jan. 30, 1968 A. R. ALLEN 3,366,153
TIRE BEAD SEATING AND INFLATING MEANS FOR TUBELESS TIRE CASINGS
Filed July 5, 1966

INVENTOR
ALFRED RAY ALLEN

BY

ATTORNEY

United States Patent Office 3,366,153
Patented Jan. 30, 1968

3,366,153
TIRE BEAD SEATING AND INFLATING MEANS
FOR TUBELESS TIRE CASINGS
Alfred Ray Allen, 3013 S. Eye St.,
Bakersfield, Calif. 93304
Filed July 5, 1966, Ser. No. 562,676
4 Claims. (Cl. 157—1.1)

This invention relates to a device for quickly seating the beads of tubeless tire casings against the flanged rims of a vehicle wheel upon which the casing is to be mounted. It is well-known that incident to mounting and inflating tubeless tire casings upon vehicle wheel rims, the sidewalls of the casing normally collapse toward each other, in an axial direction, when initially positioned circumferentially upon a vehicle wheel. A valve stem is mounted in one flange of the rim of the wheel and when an air hose is connected to said valve stem and air under pressure is discharged through the valve stem, the usual occurrence is that substantially all of the air wastefully discharges between the upper sidewall of the tire casing, for example, and the upper rim of the wheel because there is no satisfactory means to cause discharge of air directly into the interior of the casing only.

Various types of relatively complex devices have been designed heretofore for purposes of establishing a seal between the sidewalls of a tubeless tire casing and the adjacent rim of the wheel upon which the tire is to be mounted, said means primarily including appropriate frictional engagement, for example, between the device and the rim of the wheel, such devices usually requiring relatively elaborate supporting means. Further, it is obvious that for each different diameter of wheel rim, there must be a suitable size of circular member to effect the aforementioned seal between the sidewall of the tire casing and the rim of the wheel.

It is the principal purpose of the present invention to provide an extremely simple and inexpensive bead seating and inflating means for use with tubeless tire casings when mounting them upon vehicle wheels to very quickly effect a highly efficient seal with respect to the upper sidewall of a tubeless tire casing when mounted loosely upon a vehicle wheel and lying upon a flat surface such as a floor of a service station, said means being capable of effecting a satisfactory air seal against the upper sidewalls of tire casings of a reasonable range of different diameters.

Another object of the invention is to provide a tub-like housing which may be placed, in inverted manner, over an interfitted wheel and tubeless tire casing when lying upon a substantially flat surface, as described immediately above, said housing having an air line passing therethrough and connectable to the valve stem in the rim of the wheel and the air line otherwise being provided with a valve mounted exteriorly of the housing, whereby when the valve is opened to admit air to the valve stem, only a very limited amount of air escapes into the interior of the inverted housing while most of the air is discharged into the interior of the tire casing to effect substantially instantaneous inflation thereof to dispose the sidewalls of the tire casing respectively against the flanges of the vehicle wheel, after which the housing may be removed while continued inflation of the tire casing takes place to the desired pressure.

A further object of the invention is to provide a clamping type hose chuck on the inner end of the air hose for connection to the valve stem in the rim of the wheel prior to pressing the inverted housing against the uppermost side wall of the tire casing in the manner described above.

Still another object of the invention is to provide several different embodiments of constructions for extending the air line through the housing, all of which are relatively simple and inexpensive.

Details of the invention and the foregoing objects, as well as other objects thereof, are set forth in the following specification and illustrated in the accompanying drawing comprising a part thereof.

Figure 1:
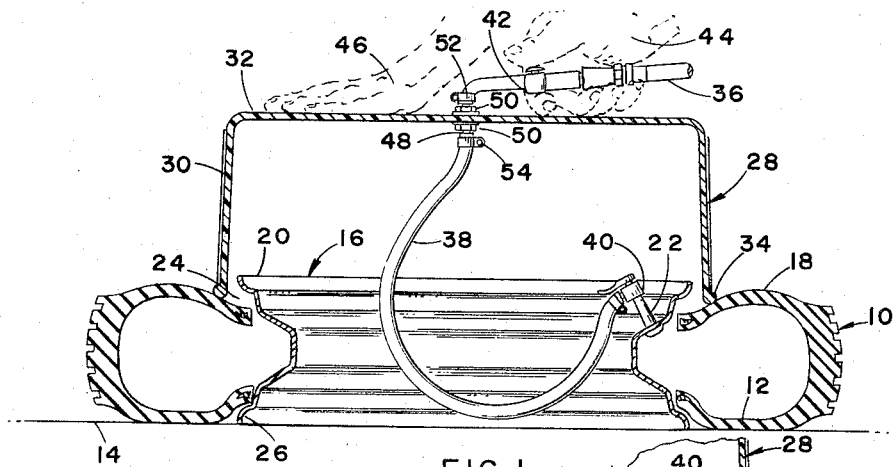
FIG. 1 is a vertical sectional view of an exemplary tubeless tire casing and vehicle wheel with respect to which the tire casing is to be inflated, said casing being engaged by bead seating and inflating means embodying the principles of one embodiment of the present invention, the casing being shown in uninflated condition in said figure.

The preferred method of using the bead seating and inflating means of the present invention is illustrated basically in FIG. 1, wherein it will be seen that a tubeless tire casing 10 is disposed with one sidewall 12 against a preferably flat supporting surface 14, such as a floor of a service station, with a flanged vehicle wheel 16 placed within the circumference of the tire casing 12 and also lying upon the supporting surface 14. Under such circumstances, the upper side wall 18 of the deflated tire casing 10 is depressed and spaced downwardly appreciably from the uppermost flange 20 of wheel 16. The present tendency toward the use of modern 2 ply sidewalls in the tire casings, frequently results in such upper wall being very extensively depressed toward the lower sidewall when the casing and wheel are lying as shown in FIG. 1.

The wheel 16 is also provided in the customary flange portion thereof with a conventional valve stem 22 which preferably is of the type having an internal spring-actuated air valve therein of standard commercial type. Under such circumstances, when a conventional air line is connected to the valve stem 22 and air commences to be discharged under pressure through the valve stem, most of the air escapes through the annular opening 24 between the rim of the upper sidewall 18 of the tire casing and the uppermost flange 20 of the wheel 16. Great difficulty is experienced in preventing this from occurring and the present invention provides an extremely simple means to minimize such wasteful discharge of air and, more importantly, waste of time consumed endeavoring to effect inflation of the opposite sidewalls of the tire casing 10 respectively into engagement with the uppermost flange 20 and lowermost flange 26 of wheel 16.

Figure 4:
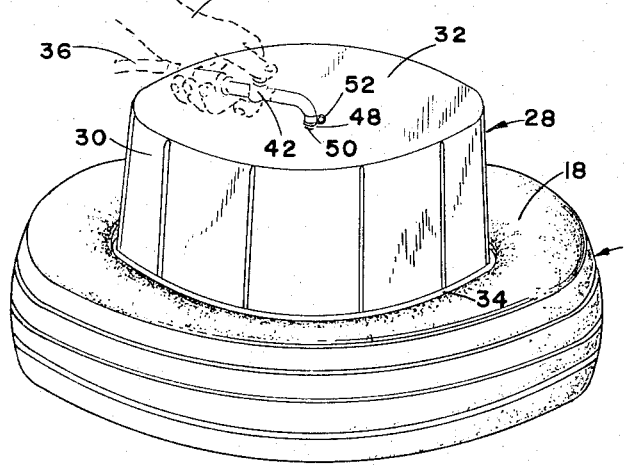
FIG. 4 is a view similar to FIG. 3, but showing the housing of the present invention mounted in operative position with respect to the upper side wall of the tubeless tire casing incident to inflating the sidewalls outwardly against the wheel flanges.
Figure 3:
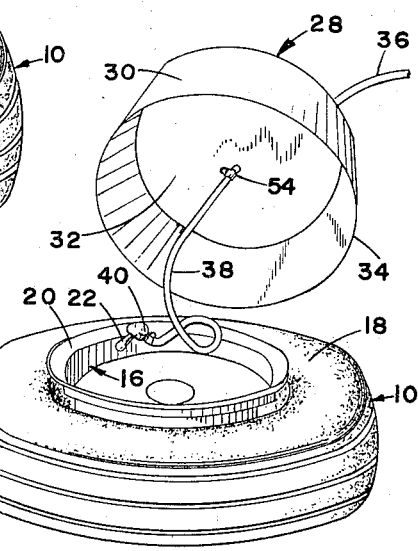
FIG. 3 is a somewhat exploded, perspective view showing the air hose of the bead seating and inflating means of the present invention connected to the valve stem on the vehicle wheel and the tire extending around the wheel in uninflated condition preparatory to the housing of the invention being mounted in operative position with respect to the upper sidewall of the tire casing.

The preferred embodiment of the present invention comprises a tub-like housing 28 which has a circular sidewall 30, the upper end of which is closed by an end wall 32. In the specific illustration of FIGS. 1, 3 and 4, the end wall 32 is shown to be substantially flat but any appropriate alternative shape may be used. For example, the tub-like housing may be somewhat hemi-spherical if desired within the spirit of the present invention as long as there is a circular rim 34, preferably of a smoothly rounded nature, which defines an open face having a diameter suitably larger than the diameter of the flanges of the wheel upon which the tire casing 10 is to be mounted so that said open face readily may accept the uppermost flange 20 of the wheel, preferably without binding. Otherwise, the diameter of said open face also preferably is sufficiently large to accommodate a range of different diameters of rims of vehicle wheels, within reason, thereby minimizing the number of sizes of housings 28 which any individual service station may require in order properly to service substantially all diameters of tubeless tires, within reasonable limits, when mounting them upon the wheels therefor.

The present invention also contemplates the use of a standard type of air hose 36 which is connectable at one end of a compressed air tank or the like. Said hose, in effect, extends through the housing 28 so as to provide an inner hose section 38 which is sufficiently long that a clamp-type hose chuck 40 on the outer end thereof may be connected to the valve stem 22 while the housing is removed from engagement with the tire casing, such as shown in exemplary manner in FIG. 3. After this has been accomplished and while the casing and wheel are lying adjacent a flat supporting surface such as floor 14, the housing 28 then is disposed against the upper sidewall 18 of the tire casing 10 with the circular rim 34 of the housing preferably being concentric with respect to the rim of said sidewall as well as the rim 20 of the wheel 16.

Air hose line 36 preferably has a manually operable valve 42 therein, exterior of housing 28, which is engaged by one hand 44 of the operator while the wheel of the other hand 46 of the operator, for example, presses upon the upper, closed end 32 of housing 28 to effect substantially complete air sealing engagement simultaneously between the lower sidewall 12 of tire casing 10 and the flat supporting surface 14, as well as between the circular rim 34 of housing 28 and the upper sidewall 18 of tire casing 10. Under such circumstances, any air initially discharged through valve stem 22 and introduced into the tire casing or escaping therefrom into the interior of housing 28 necessarily will be contained therein up until reasonable pressure is generated therein, commensurate, for example, with the amount of pressure exerted by the hand 46 of the operator upon the housing.

Figure 2:
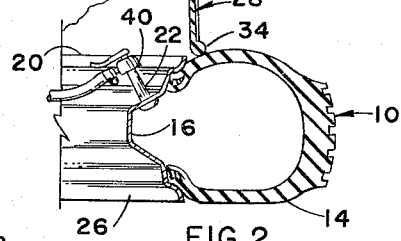
FIG. 2 is a fragmentary vertical sectional view similar to the lower right-hand portion of FIG. 1, but illustrating the tire casing in at least partially inflated condition with respect to the wheel rim.

Although a limited amount of air initially will escape through the annular opening 24 between the rim and the upper sidewall 18 and the upper rim 20 of wheel 16, such escaping air rapidly dissipates into the interior of housing 28 but meanwhile, since no appreciable amount of air is escaping to atmosphere, the main volume of air being discharged under such circumstances through valve stem 22 is directed into the interior of the casing 10, whereupon such air, upon expanding therein, rapidly inflates the upper sidewall 18 of the tire casing 10 against the uppermost flange 20 of the wheel 16, until the tire casing 10 assumes the position fragmentarily illustrated in FIG. 2 with respect to the rims 20 and 26 of wheel 16. When this operation has occurred, it no longer is necessary to exert sealing pressure upon the housing 28 and the same may be released by the operator. If desired, however, inflation of the tire casing 10 may continue uninterruptedly until the desired amount of internal pressure has been reached, such as determined by a conventional tire pressure gauge.

The air hose line 36 may be extended through one of the walls of the housing 28 in several different ways. It is not essential also that said hose extend through the end wall 32 because it might just as well be extended through a suitable location in the sidewall 30 within the spirit of the invention. The essential thing is to extend it through one of the walls and this may be done, for example, in the embodiment shown in FIGS. 1, 3 and 4, such as by forming an appropriate opening or hole in the end wall 32 and extending a threaded nipple 48 therethrough.

Appropriate clamping nuts 50 are threaded thereon against suitable sealing washers, for example, to provide airtight sealing engagement against opposite surfaces of the end wall 32. In effect, one end of the so-called outer air hose line 36 is connected to the upper end of nipple 48 by a hose clamp 52, while one end of the inner hose line section 38 is connected by a hose clamp 54 to the opposite end of nipple 48, thereby it will be seen that the hose line of the entire system actually is divided intermediately of its ends incident to passing through a wall of the housing 28, primarily for purposes of effecting an airtight relationship with said wall.

Figure 5:
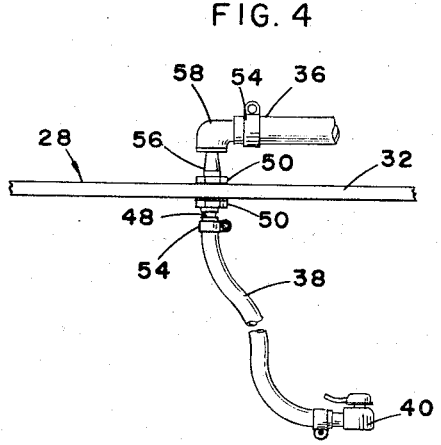
FIG. 5 is a fragmentary view, partly broken away to foreshorten the same, and illustrating another embodiment of means for connecting the air line to the housing of the present invention so as to extend both inwardly and outwardly therefrom.

Another arrangement for connecting the air hose line to the housing 28 is illustrated fragmentarily in FIG. 5, wherein the housing is represented by a fragmentarily illustrated portion of the end wall 32. The nipple 48 extends therethrough with the clamping nuts 50 and sealing washers thereon and another valve stem 56, similar to valve stem 22, for example, is connected to the outer end of nipple 48. As an alternative, the valve stem 56 may be connected directly to end wall 32 and the inner hose line section 38 is connected at one end to either the inner end of nipple 48 by hose clamp 54, or suitably to the inner end of valve stem 56. The opposite end of hose line section 38 has the same clamp-type chuck 40 thereon as illustrated in the preceding embodiment.

In view of the provision of the additional valve stem 56 so as to be directly supported by the exterior of the housing 28, it is possible to employ a conventional type of hose chuck 58 on the end of the air hose line 36 which, in the preceding embodiment, is connected to nipple 48. By the arrangement shown in FIG. 5, therefore, and assuming that the valve stem 56 has a conventional air valve therein as described above with respect to valve stem 22, when the hose chuck 58 is seated on the outer end of the valve stem 56, air will be delivered under pressure to the valve stem 56 and open the conventional air valve therein for delivery of air through the inner hose line section 38 to the valve stem 22 on the wheel 16, whereupon the tubeless tire casing will have its opposite sidewalls inflated quickly, as is explained above in regard to the preceding embodiment.

While the invention has been described and illustrated in its several preferred embodiments, it is to be understood that the invention is not to be limited to the precise details herein illustrated and described since the same may be carried out in other ways falling within the scope of the invention as claimed.

I claim:

1. Bead seating and inflating means to facilitate inflating the sidewalls of a tubeless vehicle tire casing against the flanges of a vehicle wheel having a valve stem mounted on one of the rim flanges thereof, said means comprising a circular tub-like housing having one open face defined by a circular rim of larger diameter than the rim of a wheel upon which a tire casing is to be mounted, an air hose line extending through said housing from the exterior to the interior thereof and connectable at the outer end to a source of air under pressure, a clamp-type hose chuck on the inner end of said hose line, and a manually operable valve in said air line exterior of said housing, said housing being engageable against the uppermost sidewall of an uninflated tire casing lying upon a flat surface with a wheel positioned within the tire casing after connecting said hose chuck to said valve stem in said wheel rim flange, whereby when said housing is pressed downwardly upon said tire casing air seals are established respectively between the lower sidewall thereof and said flat surface and between said upper sidewall and rim of said housing and upon opening said air valve in said hose line only a limited amount of air escapes into said housing from said tire casing while said sidewalls are quickly inflated into engagement with the flanges of said wheel, whereupon the housing may be released while inflation of the tire casing continues.

2. The bead seating and inflating means according to claim 1 in which said housing has an end wall extending across one end of circular sidewalls thereof and opposite the open face of said housing, said end wall having an opening therethrough and said air hose line extending therethrough in airtight relationship therewith.

3. The bead seating and inflating means according to claim 2 in which said opening in said end wall of said housing has a nipple extending therethrough and clamping nuts thereon respectively clamped against opposite surfaces of said end wall, said air hose line being separated intermediately of its ends and the separated ends thereof being connected respectively to the opposite ends of said nipple.

4. The bead seating and inflating means according to claim 1 in which said housing has an end wall extending across one end of the circular sidewalls and said end wall has an opening therein and a valve stem mounted in said opening and provided with an air valve, said air hose line being divided intermediately of its ends to separate the inner and outer end portions relative to said housing, the inner end being connected to said valve stem and the outer end having a hose chuck thereon engageable with said valve stem on the end wall of said housing to deliver air therethrough.

References Cited

UNITED STATES PATENTS

| 2,779,397 | 1/1957 | Kohsiek | 157—1.1 |
| 2,849,059 | 8/1958 | Bosomworth | 157—1.1 |

FOREIGN PATENTS

| 814,172 | 6/1959 | Great Britain. |

GRANVILLE Y. CUSTER, Jr., *Primary Examiner.*